Patented Jan. 9, 1923.

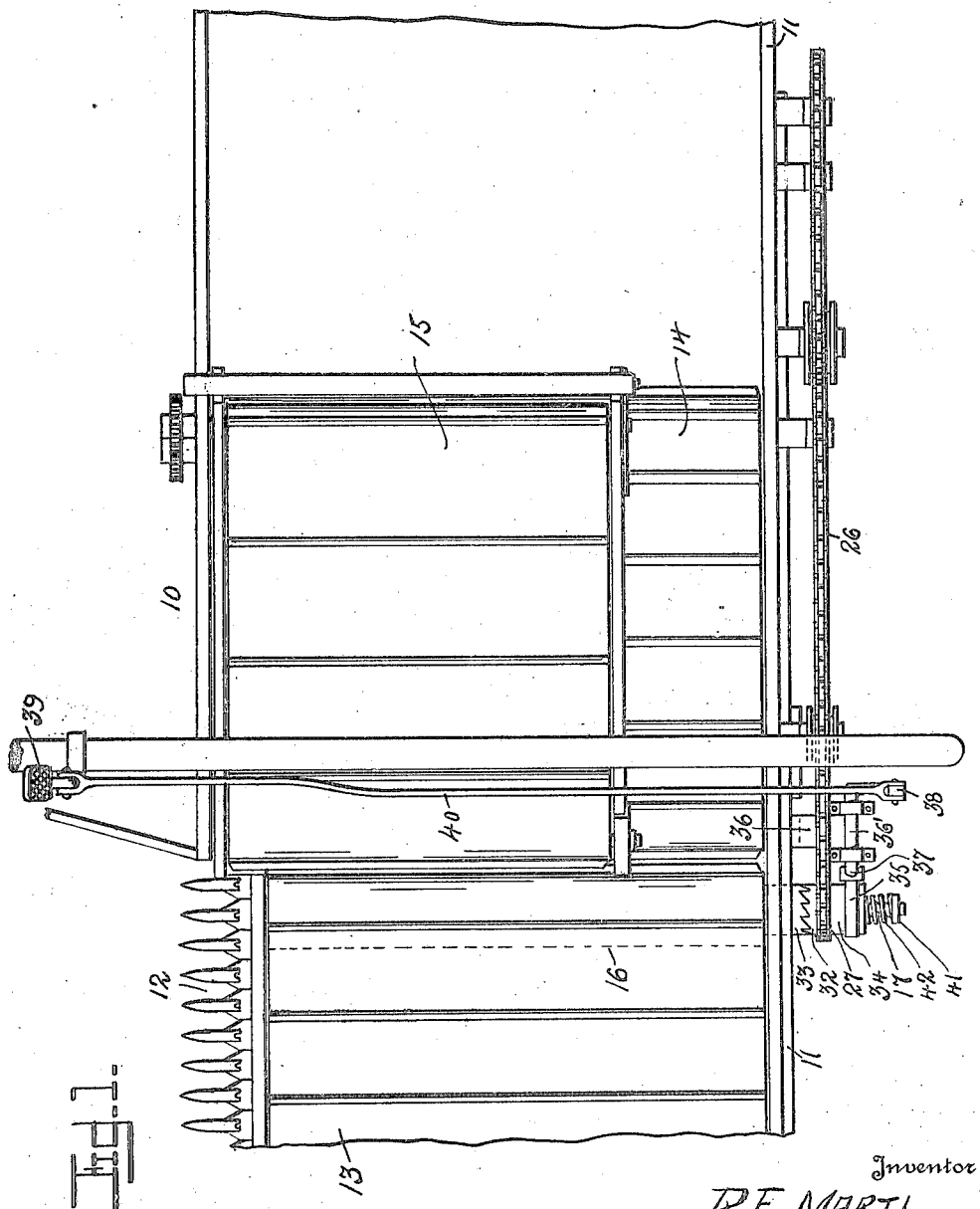

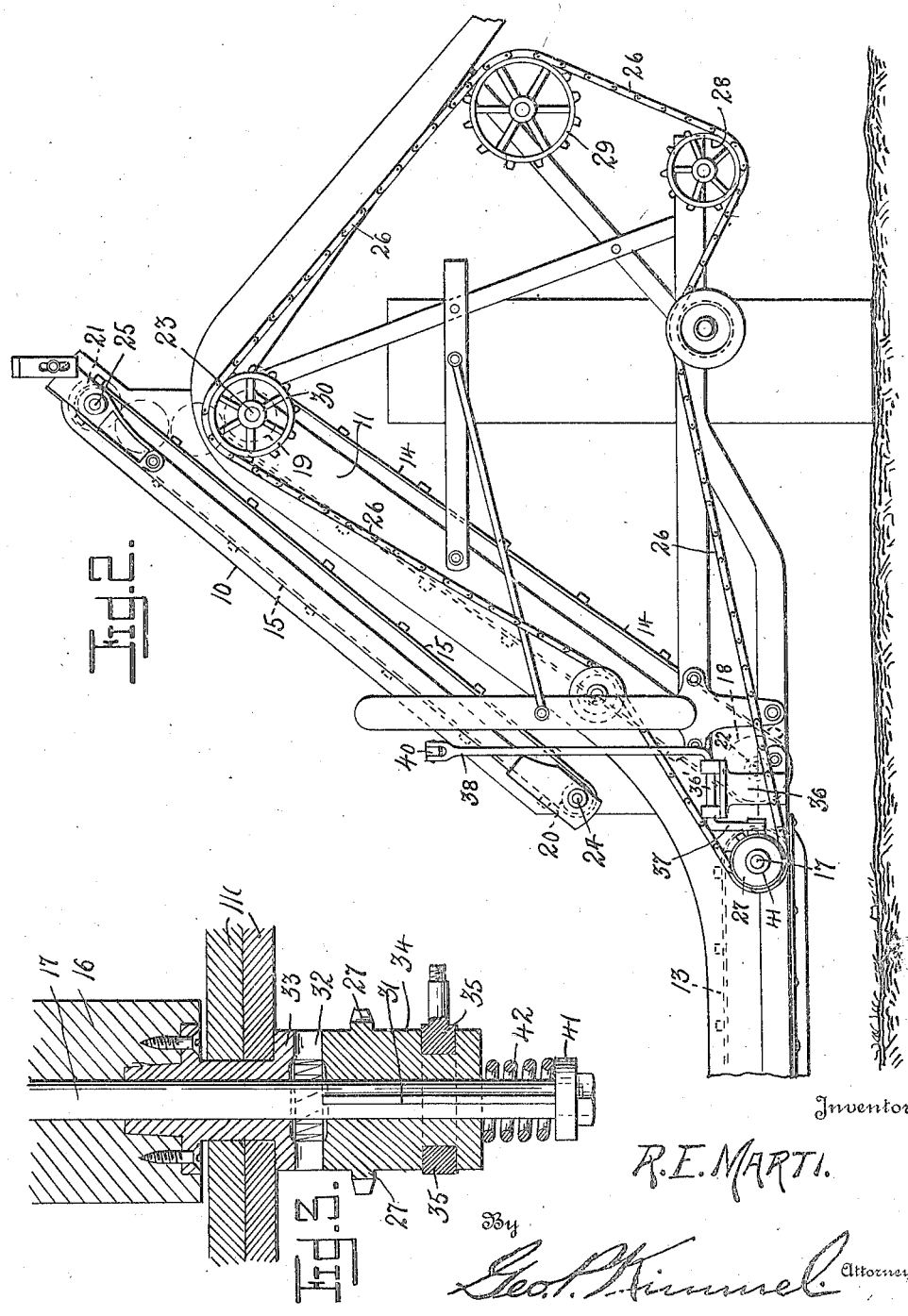

1,441,867

UNITED STATES PATENT OFFICE.

RUDOLPH E. MARTI, OF POCAHONTAS, ILLINOIS.

HARVESTER FEED CONTROL.

Application filed October 18, 1920. Serial No. 417,660.

*To all whom it may concern:*

Be it known that I, RUDOLPH E. MARTI, a citizen of the United States, residing at Pocahontas, in the county of Bond and State of Illinois, have invented certain new and useful Improvements in a Harvester Feed Control, of which the following is a specification.

This invention relates to grain harvesters, more particularly to the class of combined harvesters and binders, and has for one of its objects to provide a device of this character having means whereby the flow of the cut grain may be retarded or checked in its passage over the platform canvas or apron to equalize the supply to the elevator elements and thus adapt the machine to the condition of the grain and secure uniformity of the action and consequent uniformity in the sizes of the bundles.

Another object of the invention is to provide a device of this character having means whereby thin or short grain is conducted to the binder mechanism with equal facility and uniformity as heavy and long grain.

With these and other objects in view, the invention consists in certain novel features of construction as hereinafter shown and described and then specifically pointed out in the claim, and in the drawings illustrative of the preferred embodiment of the invention.

Figure 1 is a plan view of a portion of a grain harvester with the improvements applied.

Fig. 2 is a rear elevation of the parts shown in Fig. 1.

Fig. 3 is an enlarged sectional detail of the clutch portion of the device.

When operating a harvester under normal condition or when the grain being harvested is of normal growth, the platform or apron and conveyor belts will take care of it, and feed it uniformly to the binder. If, however, the grain is of abnormally light growth it is liable to become tangled between the elevating belts, and the heads of the grain disposed at either end of the sheaf and clogging the elevating belts. To remedy this difficulty, the present invention has been devised, which consists primarily in providing means under the control of the driver for checking or retarding the movement of the grain toward the elevating means when the growth is below normal, and permitting it to accumulate upon the horizontal apron or platform until a sufficient quantity has been received to correspond to normal growth, and then releasing the holding means to permit the elevating operation to proceed.

The improved device may be applied without material structural change to harvesters of various forms of construction, but for the purpose of illustration is shown applied to the main drive mechanism of the platform or horizontal slatted canvas apron of conventional construction.

The forward supporting frame member is represented at 10, the rear frame member at 11, the sickle device as a whole at 12, the platform or horizontal slatted carrier apron at 13, the lower inclined slatted elevator belt at 14, and the upper slatted conveyor belt at 15.

The roller or drum at the delivery end of the platform apron is represented at 16 and mounted loosely or rotative on the drive shaft 17, while the conveyor belts are mounted to be rotated respectively upon drums 18—19—20 and 21, the latter having supporting shafts 22—23—24 and 25 journalled in the supports 10 and 11.

The drive chain for the apron 13 and conveyor belt 14 is indicated at 26, and arranged to operate in the usual manner over chain wheels 27—28—29 and 30 on the shafts 17 and 23 and the shafts of the chain wheels 28 and 29.

The chain wheel 27 is rotative with the shaft 17 and slidable thereon by a feather or key 31 and is provided with a clutch element 32, while the shaft 17 is provided with an opposing clutch element 33 fast to the roller 16 and loose upon the shaft 17.

The hub 34 of the chain wheel 27 is formed with an annular channel to receive a shipper ring 35, and supported in any suitable manner, for instance by a bracket 36 attached to the adjacent support 11, is a rock shaft 36' having a crank arm 37 at one end attached to the shipper ring and extended at the other end into an operating lever arm 38.

Mounted on the frame work of the harvester at a point within reach of the foot of the driver, is a pedal device 39, the latter coupled to the lever 38 by a rod 40. At its outer end the shaft 17 is provided with means, such as a head 41, to support the outer end of a spring 42 operating against the hub 34, to maintain the clutch yieldably closed.

By this simple arrangement so long as the pedal 39 is in inoperative position, the spring 42 will maintain the clutch in closed position and thus cause the rotation of the shaft 17 to be transmitted to the roller 16 and platform carrier 13, but when the pedal 39 is shifted to operative position the rod 40 will be actuated for rocking the shaft 36', causing thereby the crank arm 37 to carry the shipper ring 35 therewith and move the clutch element 32 out of engagement with the clutch element 33, whereby the operation of the loose roller will be discontinued.

The motion of the platform carrier can thus be checked and the flow of the grain carried thereby retarded at will, and allowed to accumulate as required.

The "feed" of the carrier is thus controllable independently of the action of the elevating devices.

The preferred embodiment of the invention is disclosed in the drawings and set forth in the specification, but it will be understood that any modifications within the scope of the claim may be made in the construction without departing from the principle of the invention or sacrificing any of its advantages.

I claim:

A harvester feed control comprising the combination with a plurality of conveyor operating elements each including a sprocket wheel mounted on a driven shaft, and a driving chain engaging with said sprocket wheels, one of said shafts carrying a loosely mounted roller adapted to be clutched therewith, and one of said wheels including a hub keyed to that shaft provided with the loose roller, of means carried by said loose roller and said hub to provide a clutch for coupling the loose roller to its shaft, means for yieldingly maintaining said clutch in normally operative position to synchronously operate said loose roller and said shafts, and means for shifting said clutch to inoperative position to discontinue the operation of the loose roller without discontinuing the synchronous operation of said shafts.

In testimony whereof, I affix my signature hereto.

RUDOLPH E. MARTI.